(12) United States Patent
Ikeo et al.

(10) Patent No.: US 9,389,390 B2
(45) Date of Patent: Jul. 12, 2016

(54) LENS BARREL

(71) Applicant: Panasonic Intellectual Property Management Co., Ltd., Osaka-shi, Osaka (JP)

(72) Inventors: Kenji Ikeo, Osaka (JP); Masahiro Inata, Hyogo (JP); Hideo Onishi, Osaka (JP); Takayuki Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/733,973

(22) Filed: Jun. 9, 2015

(65) Prior Publication Data

US 2015/0268444 A1      Sep. 24, 2015

Related U.S. Application Data

(63) Continuation of application No. PCT/JP2014/003567, filed on Jul. 4, 2014.

(30) Foreign Application Priority Data

Sep. 30, 2013   (JP) ................................ 2013-203341

(51) Int. Cl.
*G02B 7/02*        (2006.01)
*G02B 7/04*        (2006.01)
(Continued)

(52) U.S. Cl.
CPC .. *G02B 7/04* (2013.01); *G02B 7/08* (2013.01); *G02B 7/105* (2013.01); *H04N 5/225* (2013.01); *H04N 5/2254* (2013.01); *H04N 5/232* (2013.01)

(58) Field of Classification Search
CPC .......................................................... G02B 7/04
USPC .......................................................... 359/825
See application file for complete search history.

(56) References Cited

U.S. PATENT DOCUMENTS

| 4,456,342 A | 6/1984 | Muryoi |
| 4,645,310 A | 2/1987 | Kohmoto |

(Continued)

FOREIGN PATENT DOCUMENTS

| JP | S57-66425 A | 4/1982 |
| JP | S59-48718 A | 3/1984 |

(Continued)

OTHER PUBLICATIONS

PCT/JP2014/003567 International Search Report issued on Oct. 7, 2014.

(Continued)

*Primary Examiner* — James Jones
(74) *Attorney, Agent, or Firm* — Shinjyu Global IP (57) ABSTRACT

An imaging device comprises an imaging optical system with a plurality of lenses, a focusing manipulation component, an imaging state switching manipulation component, and first, second, third, and fourth restrictors. The focusing manipulation component can be turned to change the focal position formed by the imaging optical system. The imaging state switching manipulation component can be turned to move lenses and switch between the first imaging state and the second imaging state. When the imaging state switching manipulation component is turned, the range over which the focusing manipulation component can be turned is switched from a first range that is restricted by first and second restrictors, to a second range that is restricted by third and fourth restrictors and that is at least partly shifted from the first range.

5 Claims, 6 Drawing Sheets

(51) Int. Cl.
*G02B 7/105* (2006.01)
*H04N 5/225* (2006.01)
*H04N 5/232* (2006.01)
*G02B 7/08* (2006.01)

(56) References Cited

U.S. PATENT DOCUMENTS

| | | | |
|---|---|---|---|
| 4,720,182 A | 1/1988 | Imanari | |
| 6,490,099 B2 * | 12/2002 | Sasaki | G02B 7/102 359/699 |
| 7,493,033 B2 | 2/2009 | Triteyaprasert et al. | |
| 2006/0140608 A1 | 6/2006 | Triteyaprasert et al. | |
| 2010/0027139 A1 * | 2/2010 | Terada | G02B 7/102 359/823 |

FOREIGN PATENT DOCUMENTS

| | | |
|---|---|---|
| JP | S60-14210 A | 1/1985 |
| JP | S60-66216 A | 4/1985 |
| JP | S60-145411 U | 9/1985 |
| JP | S61-113015 A | 5/1986 |
| JP | S63-8712 U | 1/1988 |
| JP | H06-67077 A | 3/1994 |
| JP | H06-294920 A | 10/1994 |
| JP | 2006-184816 A | 7/2006 |

OTHER PUBLICATIONS

PCT/JP2014/003568 International Search Report issued on Oct. 7, 2014.
Notice of Allowance from the co-pending U.S. Appl. No. 14/735,163 issued on Apr. 22, 2016.

* cited by examiner

LENS BARREL

CROSS-REFERENCE TO RELATED APPLICATIONS

This application is a continuation of PCT Application No. PCT/JP2014/003567 filed on Jul. 4, 2014 which claims priority to Japanese Patent Application No. 2013-203341 filed on Sep. 30, 2013. The entire disclosures of PCT Application No. PCT/JP2014/003567 and Japanese Patent Application No. 2013-203341 are hereby incorporated herein by reference.

BACKGROUND

1. Technical Field

The present disclosure relates to a lens barrel.

2. Description of the Related Art

Patent Literature 1 (Japanese Laid-Open Patent Application S57-66425) discloses a lens barrel that uses a locking member provided to a zoom ring to adjust the movable range of a focus ring.

SUMMARY

The present disclosure provides a lens barrel capable of switching between first imaging (normal imaging) and second imaging (macro imaging), in which a scale display of the focus ring is possible, and the movable range of the focus ring can be adjusted by a mechanical end.

The lens barrel disclosed herein comprises an imaging optical system with a plurality of lenses, a focusing manipulation component, an imaging state switching manipulation component, first and second restrictors, and third and fourth restrictors. The focusing manipulation component changes the focal position of the imaging optical system by a turning operation, between first imaging region and second imaging region that is at least partly different. The imaging state switching manipulation component moves at least some of the plurality of lenses by a turning operation and thereby switches between a first imaging state in which imaging is performed in the first imaging region and a second imaging state in which imaging is performed in the second imaging region. The first restrictor restricts the rotational limit position of the focusing manipulation component on the close distance side, within the first imaging region. The second restrictor restricts the rotational limit position of the focusing manipulation component on the far distance side, within the first imaging region. The third restrictor restricts the rotational limit position of the focusing manipulation component on the close distance side, within the second imaging region. The fourth restrictor restricts the rotational limit position on the far distance side, within the second imaging region. When the imaging state switching manipulation component is turned to change from the first imaging state to the second imaging state, the range over which the focusing manipulation component can be turned is switched from a first range that is restricted by the first and second restrictors, to a second range that is restricted by the third and fourth restrictors and that is at least partly shifted from the first range.

Effects

The lens barrel disclosed herein can be switched between first imaging and second imaging, can give a scale display of the focus ring, and can adjust the movable range of the focus ring with mechanical ends.

DETAILED DESCRIPTION OF THE PREFERRED EMBODIMENTS

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

Embodiment 1

Embodiment 1 will now be described through reference to FIGS. 1 to 6C.

1-1. Overall Configuration of Digital Camera (See FIGS. 1 to 3)

Figure 1:
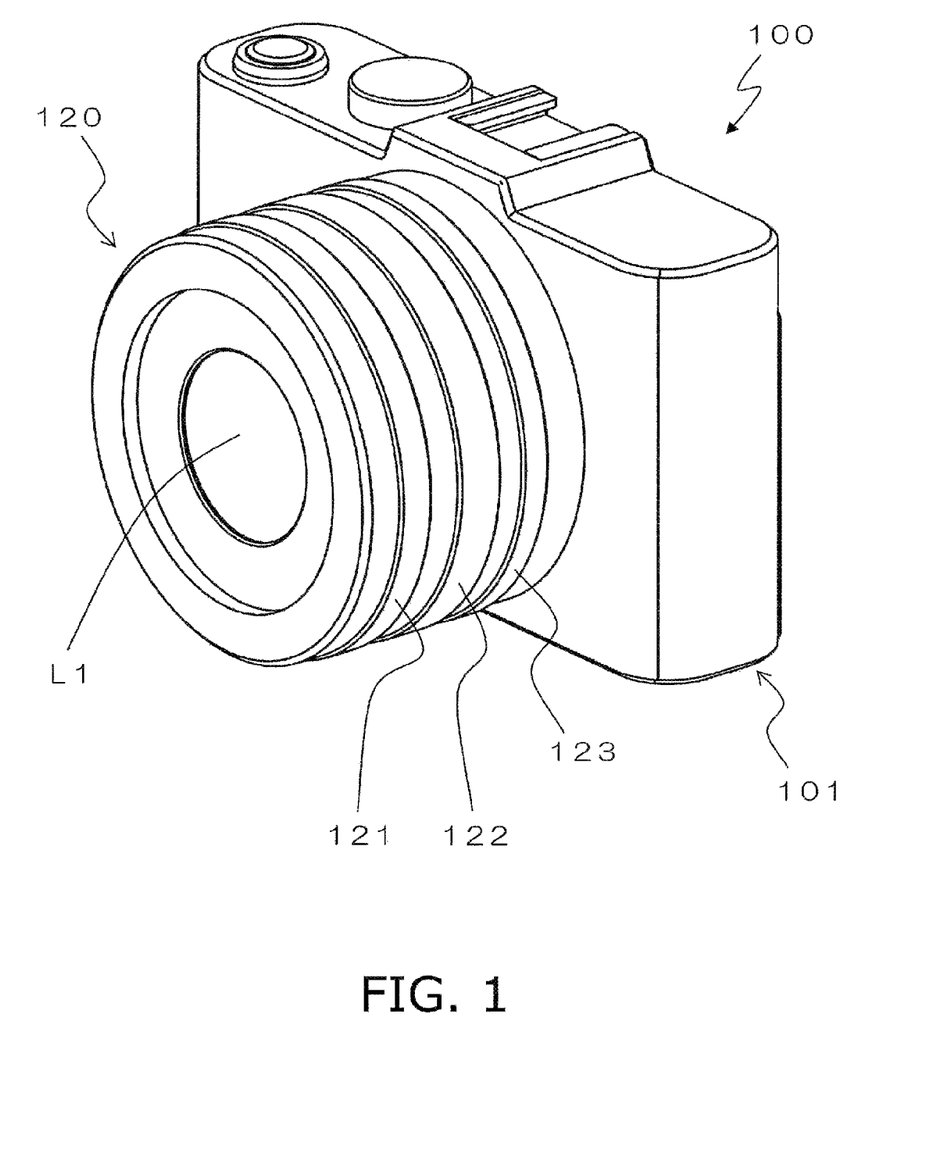
FIG. 1 is an overall oblique view of the imaging device disclosed herein.
Figure 2:
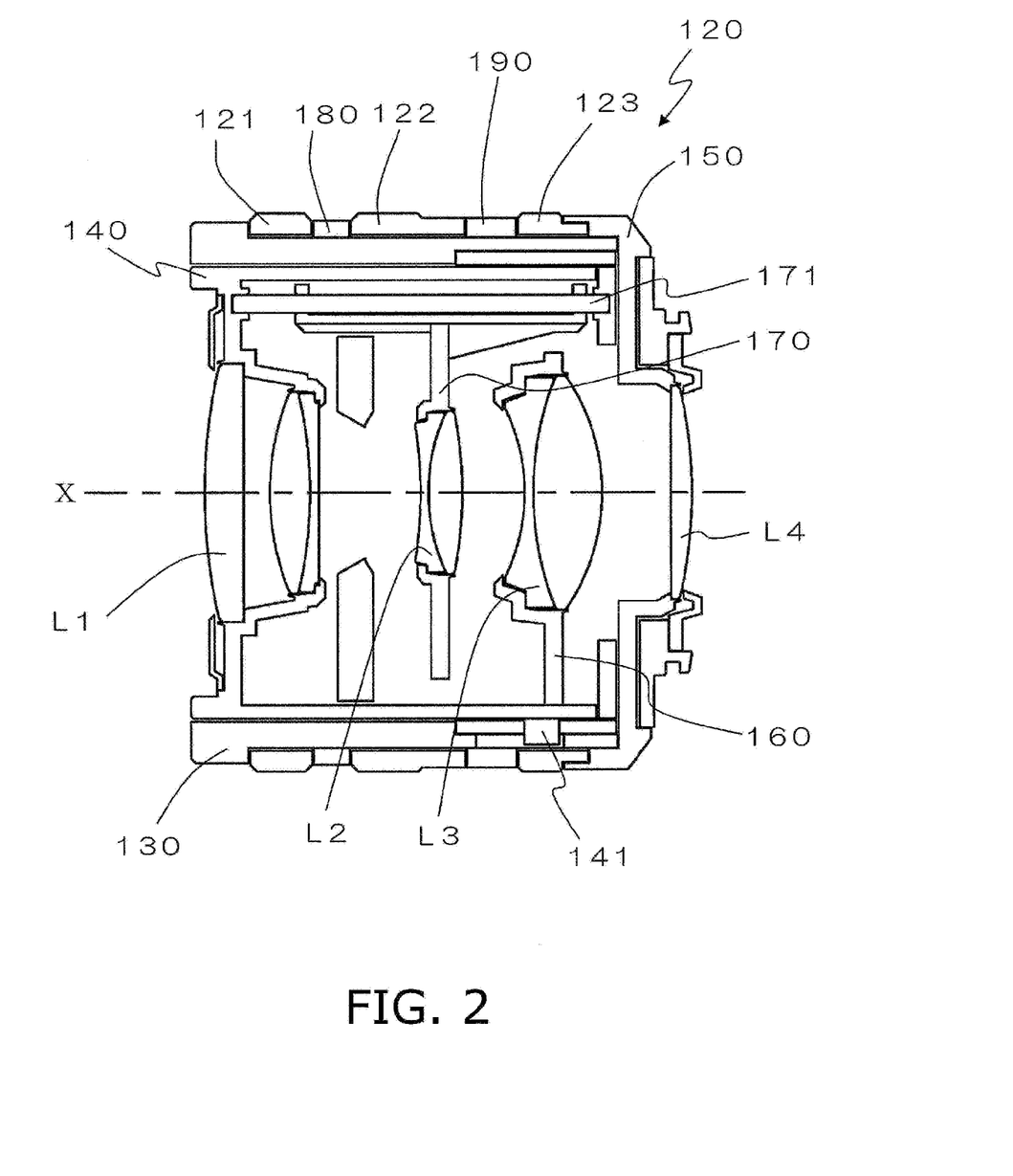
FIG. 2 is a simplified cross section of the lens barrel during normal imaging in Embodiment 1.
Figure 3:
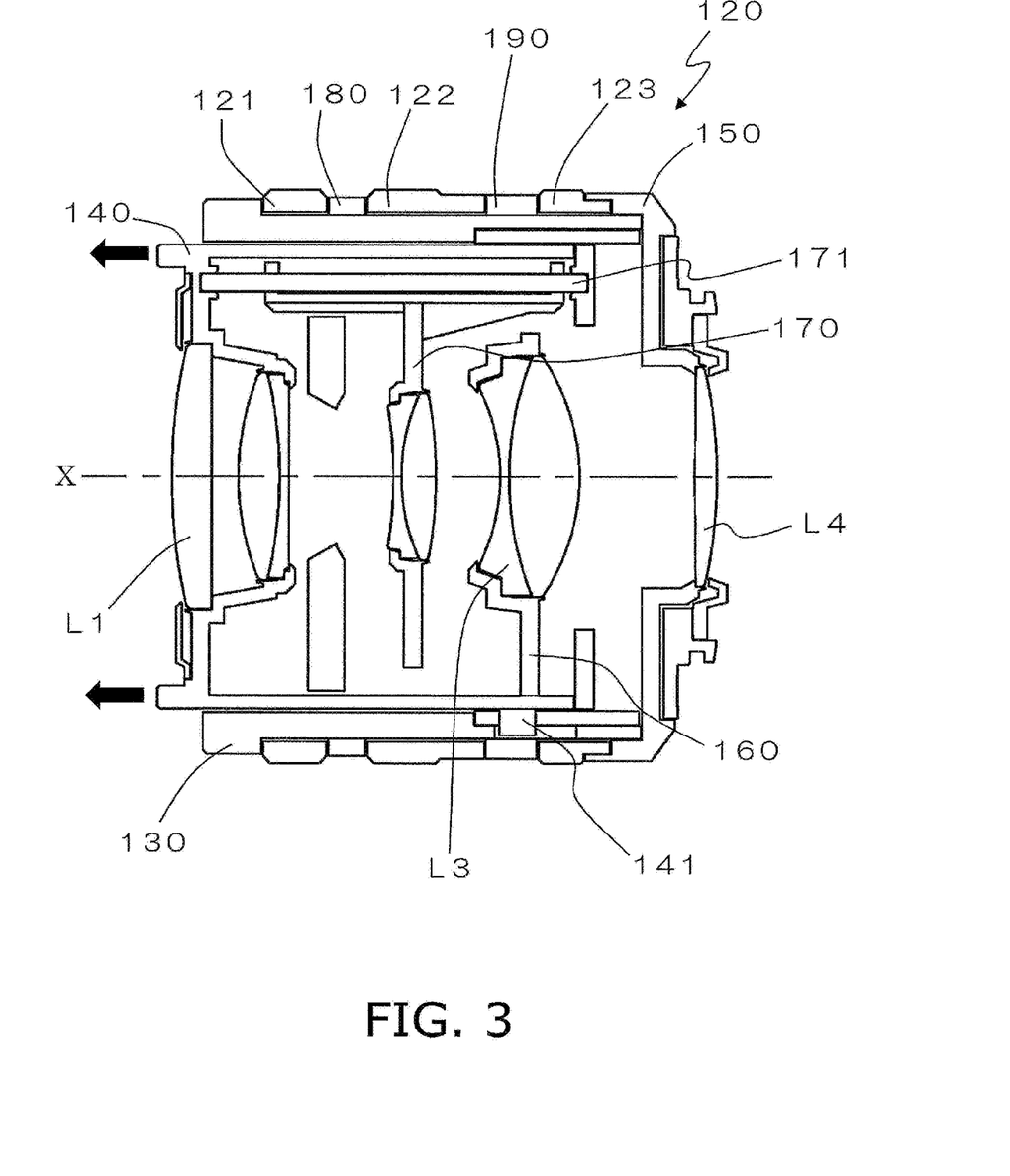
FIG. 3 is a simplified cross section of the lens barrel during macro imaging in Embodiment 1.

FIG. 1 is an overall oblique view of an imaging device 100 in this embodiment. FIG. 2 is a cross section of a lens barrel 120 in normal mode (the first imaging state). FIG. 3 is a cross section of the lens barrel 120 in macro mode (the second imaging state).

The imaging device 100 has a camera body 101 and the lens barrel 120 that is mounted to the camera body 101. The lens barrel 120 may be provided integrally with the imaging device 100, or may be removable.

The lens barrel 120 comprises a first lens group L1, a focus lens group L2, a third lens group L3, a fourth lens group L4, a stop down ring 121, a focus ring 122 (focusing manipulation component), a macro ring 123 (imaging state switching manipulation component), a stationary frame 130, a rectilinear frame 140, a base frame 150, a three-group support frame 160, a focus lens frame 170, a guide shaft 171, a first cosmetic ring 180, and a second cosmetic ring 190.

The lens barrel 120 is configured such that various members are attached to the base frame 150.

The base frame 150 supports the fourth lens group L4 at the end where the camera body 101 is mounted. The base frame 150 has the stationary frame 130 screwed to the end on the subject side.

The various members provided on the inner peripheral side of the cylindrical stationary frame 130 will now be described.

The rectilinear frame 140 is attached on the inner peripheral side of the stationary frame 130 in a state of being able to move in the optical axis X direction.

The rectilinear frame 140 is a cylindrical member that has a projection 141 sticking out from the outer peripheral side. The projection 141 engages with the macro ring 123. When the macro ring 123 is turned, the rectilinear frame 140 moves back and forth in the optical axis X direction. These mechanisms will be described in detail below.

As shown in FIGS. 1 and 2, the rectilinear frame 140 supports the first lens group L1 at the end on the subject side. The three-group support frame 160 is fixed on the inner peripheral face side of the rectilinear frame 140.

The three-group support frame 160 supports the third lens group L3.

The guide shaft 171, which is disposed parallel to the optical axis X, is provided on the inner peripheral face side of the rectilinear frame 140. The focus lens frame 170 is attached to the guide shaft 171 provided on the inner peripheral face side of the rectilinear frame 140, in a state of being able to move in the optical axis X direction.

The focus lens frame 170 supports the focus lens group L2. The focus lens frame 170 mates with the guide shaft 171, which is supported parallel to the optical axis X by the rectilinear frame 140, and is driven in the optical axis X direction by a power supply (not shown).

The various members provided on the outer peripheral side of the stationary frame 130 will now be described.

The stop down ring 121, the focus ring 122, the macro ring 123, the first cosmetic ring 180, and the second cosmetic ring 190, which are circular ring-shaped members and are turned around the optical axis X, are provided on the outer peripheral side of the stationary frame 130.

The stop down ring 121, the focus ring 122, and the macro ring 123 are turned by the user in a peripheral direction around the optical axis X, with respect to the stationary frame 130.

The rotatable ranges of the stop down ring 121, the focus ring 122, and the macro ring 123 are each limited. The rotatable ranges of these members will be discussed below.

1-2. Detailed Description and Operation (See FIGS. 2 to 6C)

The operation of the imaging device 100 configured as above will now be described.

The imaging device 100 is configured to change the subject distance range at which imaging is possible during switching between normal mode and macro mode (for example, macro mode is 0.15 to 0.35 meter, and normal mode is from 0.3 meter to infinity).

Therefore, the imaging device 100 adjusts the movable range (rotatable range) of the focus ring 122 according to switching between normal mode and macro mode. Since the movable range of the focus ring 122 is changed, the focus ring 122 is able to move within the range of the subject distance markings made on the lens barrel 120 to match the subject distance at which imaging is possible.

This mechanism will now be described in detail.

1-2-1. Detailed Configuration

FIGS. 6A to 6D show the configuration and relation of the stationary frame 130, the focus ring 122, the macro ring 123, and the second cosmetic ring 190.

Figure 6A:
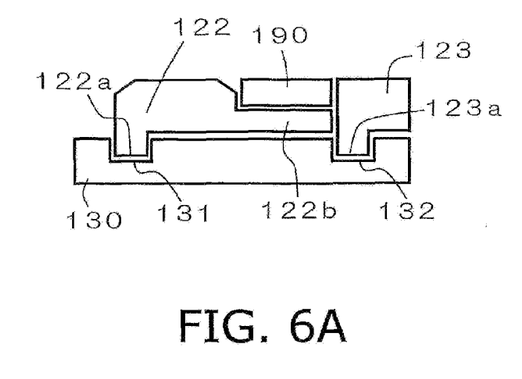
FIG. 6A is a simplified cross section of a detail enlargement of the lens barrel in Embodiment 1.

More specifically, FIG. 6A is a detail cross section of the meridional surface. "Meridional surface" means a surface that includes the optical axis and an off-axis object point of the lens.

Figure 6B:
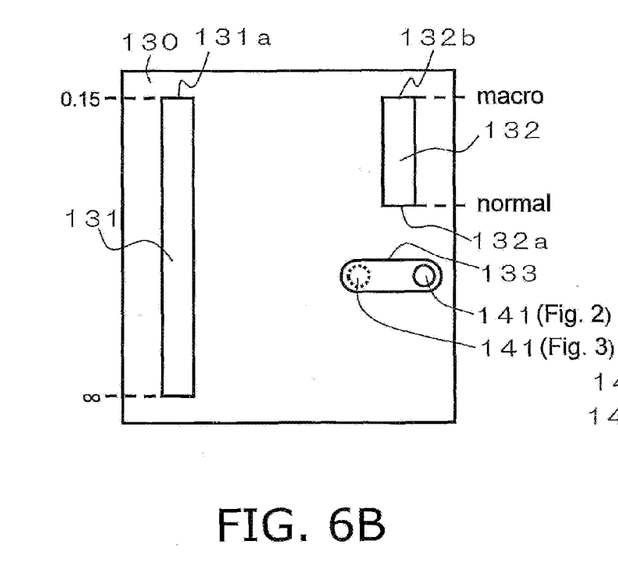
FIG. 6B is a developed view of a stationary frame in Embodiment 1.

FIG. 6B is a developed view of the stationary frame 130, as seen from the outer peripheral side.

Figure 6C:
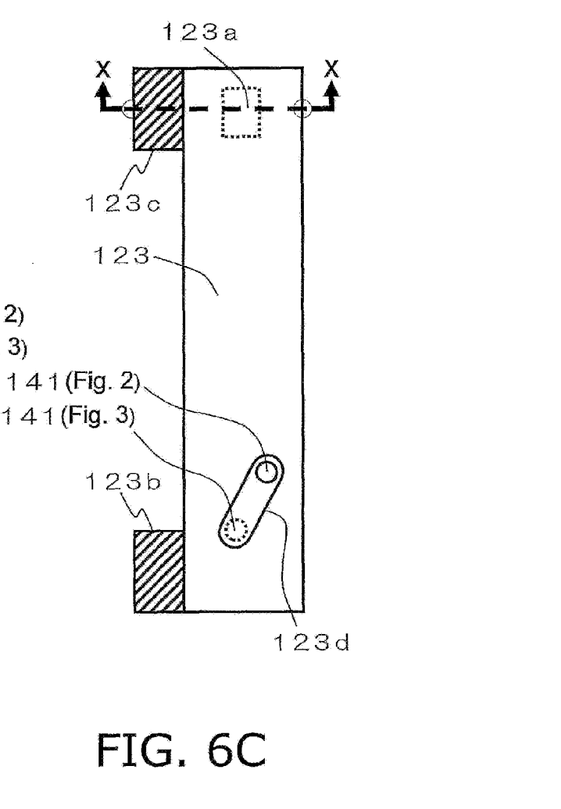
FIG. 6C is a developed view of a macro ring in Embodiment 1.

FIG. 6C is a developed view of the macro ring 123, as seen from the outer peripheral side. Components disposed on the inner peripheral side are indicated by dotted lines.

Figure 6D:
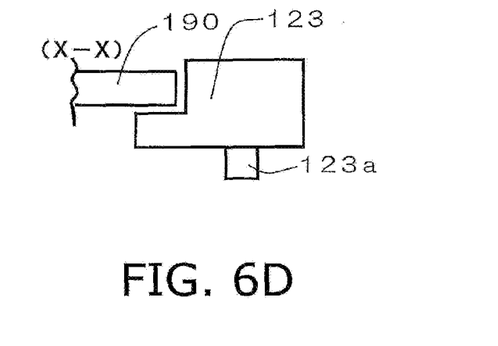
FIG. 6D shows the shape of an X-X cross section of FIG. 6C.

FIG. 6D shows the shape of an X-X cross section of FIG. 6C.

Figure 4A:
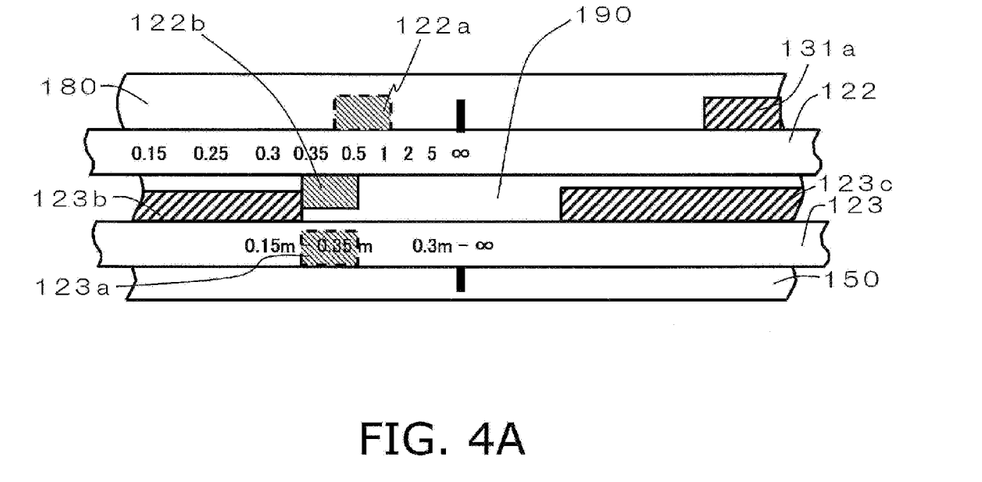
FIG. 4A shows focus markings when the subject is at a far distance during normal imaging in Embodiment 1.

The focus ring 122 is a circular ring-shaped member, and as shown in FIG. 4A, etc., is printed with markings of "0.15 0.25 0.3 0.35 0.5 1 2 5 ∞," which indicate the subject distance, on the outer surface. As shown in FIG. 6A, the focus ring 122 has a focus ring radial protrusion 122a (hereinafter referred to as the protrusion 122a) that sticks out to the inside in the radial direction, and a focus ring optical axis protrusion 122b (hereinafter referred to as the protrusion 122b) that sticks out in the optical axis direction on the inner peripheral side of the second cosmetic ring 190, toward the macro ring 123.

As shown in FIG. 4A, etc., the outer surface of the macro ring 123 is printed with a marking of "0.3 m to ∞" indicating normal mode, and a marking of "0.15 to 0.35 m" indicating macro mode. As shown in FIG. 6A, the macro ring 123 has a macro ring radial protrusion 123a (hereinafter referred to as the protrusion 123a) that sticks out to the inside in the radial direction.

The protrusion 123a restricts rotation during switching between normal mode and macro mode by means of a macro ring rotation restrictor (not shown).

As shown in FIG. 6D, the macro ring 123 is constituted in the shape of a low step on the inner peripheral side, and has a restrictor that sticks out on the subject side.

In this embodiment, a far distance end 123b (second and fourth restrictor), a normal close distance end 123c (hereinafter referred to as the close distance end 123c), and a close distance end 131a (third restrictor; FIG. 6B) are used as shown in FIGS. 4A, 4B, 5A, and 5B as means for restricting the rotation of the focus ring 122.

A cam groove 123d is also provided to the inner peripheral face of the macro ring 123.

The cam groove 123d is formed at an angle in the peripheral direction. As shown in FIG. 6C, the projection 141 of the rectilinear frame 140 (see FIG. 2) engages with the cam groove 123d.

Consequently, when the macro ring 123 is turned, the projection 141 of the rectilinear frame 140 moves from one end to the end on the opposite side in a state of being engaged in the cam groove 123d that is formed at an angle to the peripheral direction. Thus, as shown in FIG. 3, the rectilinear frame 140 is pushed out to the subject side in the optical axis X direction.

As a result, the distance of the first to third lens groups L1 to L3 with respect to the fourth lens group L4 is changed, and the imaging mode (normal mode and macro mode) can be switched.

As shown in FIG. 6B, the rotation of the macro ring 123 causes the projection 141 also to move within a rectilinear hole 133 formed so as to pass through part of the stationary frame 130.

That is, the distal end portion of the projection 141 of the rectilinear frame 140 is engaged with the cam groove 123d of the macro ring 123 in a state of being inserted into the rectilinear hole 133 of the stationary frame 130.

As shown in FIG. 6B, because the rectilinear hole 133 is formed parallel to the optical axis X direction, it does not restrict the movement of the rectilinear frame 140 in the optical axis X direction.

As shown in FIG. 6D, the second cosmetic ring 190 is provided on the outer peripheral side of the far distance end 123b and the close distance end 123c.

As shown in FIG. 6B, the stationary frame 130 is provided with a focus ring movement restricting groove 131 (hereinafter referred to as the restricting groove 131), a macro ring restricting groove 132 (hereinafter referred to as the restricting groove 132), and the rectilinear hole 133.

As shown in FIG. 6A, the restricting groove 131 is provided on the outer peripheral face side of the stationary frame 130. As shown in FIG. 6B, the restricting groove 131 has the macro close distance end 131a (hereinafter referred to as the close distance end 131a) at its end in the lengthwise direction. A protrusion 122a engages with the restricting groove 131 in a state of being able to move along the peripheral direction.

As shown in FIG. 6A, the restricting groove 132 is provided more on the camera body 101 side than the restricting groove 131 on the outer peripheral face side of the stationary frame 130. The restricting groove 132 has a normal end 132a and a macro end 132b at its two ends in the lengthwise direction. The protrusion 123a engages with the restricting groove 132 in a state of being able to move.

1-2-2. Switching Between Normal Mode and Macro Mode

The user can switch between normal mode and macro mode by turning the macro ring 123.

In Normal Mode

More specifically, when the user moves the macro ring 123 to the normal mode side, the various components are disposed as follows.

The macro ring 123 is moved to the position matching the marking "0.3 m to ∞", with respect to the marking indicating the setting displayed on the base frame 150.

At this point, the protrusion 123a comes into contact with the normal end 132a, which produces the mechanical end in normal mode. As shown in FIG. 6C, the macro ring 123 engages with the projection 141 in the cam groove 123d.

The mechanical end in normal mode mentioned above refers to the end on the normal mode side out of the two ends in the rotatable range of the macro ring 123, and to the end that restricts the rotation of the macro ring 123.

As shown in FIG. 2, in normal mode the rectilinear frame 140 is supported on the inner peripheral side of the stationary frame 130 in a state of having moved to the mounting side with the camera body 101. The far distance end 123b and the close distance end 123c are respectively disposed at the positions shown in FIGS. 4A and 4B.

In Macro Mode

On the other hand, when the macro ring 123 moves to the macro mode side, the various components are disposed as follows.

The macro ring 123 is moved to the position matching the marking "0.15 to 0.35 m", with respect to the marking indicating the setting displayed on the base frame 150.

At this point, the protrusion 123a of the macro ring 123 comes into contact with the macro end 132b, which produces the mechanical end in macro mode. As shown in FIG. 6C, the macro ring 123 engages with the projection 141 in the cam groove 123d.

The mechanical end in macro mode mentioned above refers to the end on the macro mode side out of the two ends in the rotatable range of the macro ring 123, and to the end that restricts the rotation of the macro ring 123.

As shown in FIG. 3, in macro mode the rectilinear frame 140 is supported on the inner peripheral side of the stationary frame 130 in a state of having moved to the subject side (a state in which part of the rectilinear frame 140 sticks out on the subject side). The far distance end 123b and the close distance end 123c of the macro ring 123 are disposed at the positions shown in FIGS. 5A and 5B.

1-2-3. Adjusting Movable Range of Focus Ring (Rotatable Range)

In Normal Mode

Figure 4B:
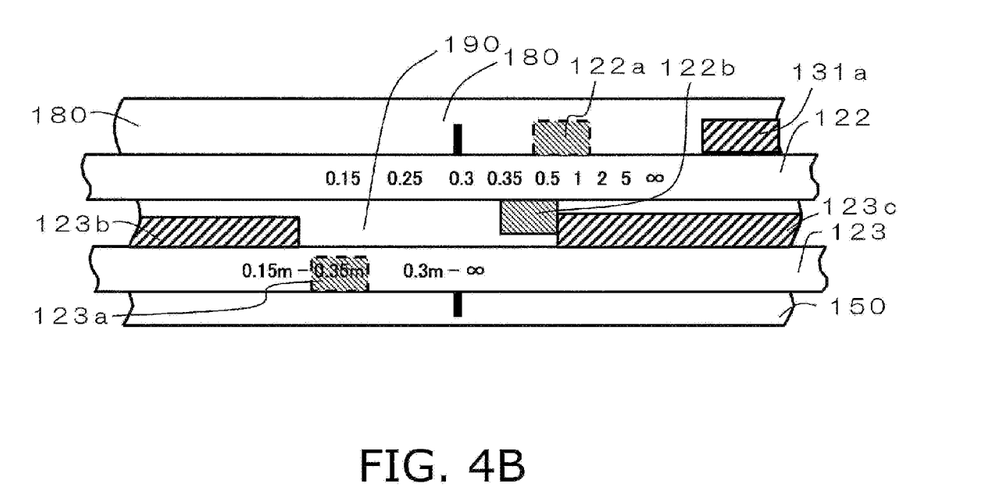
FIG. 4B shows focus markings when the subject is at a near distance during normal imaging in Embodiment 1.

As discussed above, in normal mode the far distance end 123b and the close distance end 123c that restrict the rotatable range of the focus ring 122 are disposed at the positions shown in FIGS. 4A and 4B.

Thus, the movable region (rotatable range) of the focus ring 122 in the peripheral direction is the range from the position where the protrusion 122b of the focus ring 122 touches the far distance end 123b of the macro ring 123 (the state in FIG. 4A) to the position where it touches the close distance end 123c of the macro ring 123 (the state in FIG. 4B).

That is, as shown in FIGS. 4A and 4B, in normal mode, of the two protrusions 122a and 122b formed on the focus ring 122, the protrusion 122b that sticks out along the optical axis X hits the far distance end 123b and the close distance end 123c of the macro ring 123 and thereby restricts the rotatable range of the focus ring 122.

The range of the marking in normal mode is "0.3 m to ∞."

In Macro Mode

Figure 5A:
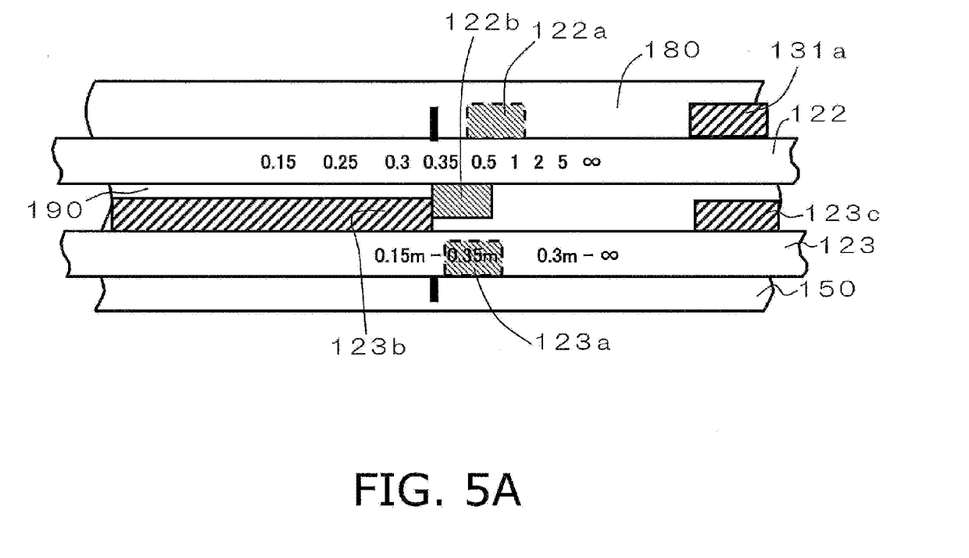
FIG. 5A shows focus markings when the subject is at a far distance during macro imaging in Embodiment 1.
Figure 5B:
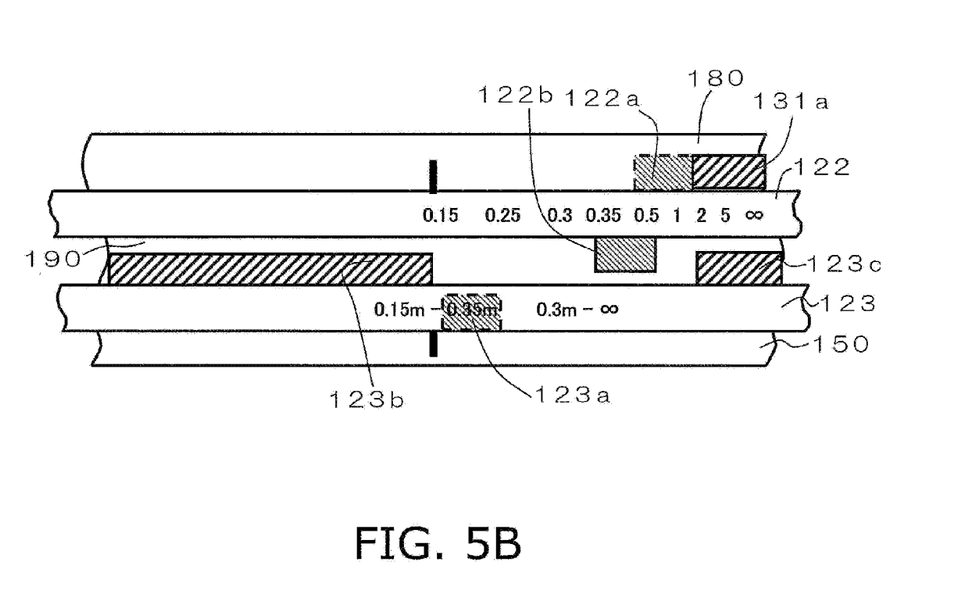
FIG. 5B shows focus markings when the subject is at a near distance during macro imaging in Embodiment 1.

On the other hand, in macro mode the far distance end 123b and the close distance end 123c that restrict the rotatable range of the focus ring 122 are disposed at the positions shown in FIGS. 5A and 5B.

The movable region (rotatable range) of the focus ring 122 in the peripheral direction is the range between the position where the protrusion 122b of the focus ring 122 touches the far distance end 123b of the macro ring 123 (the state in FIG. 5A) and the position where it touches the close distance end 131a of the restricting groove 131 formed in the stationary frame 130 (the state in FIG. 5B).

That is, as shown in FIG. 5A, on the far distance side in macro mode, of the two protrusions 122a and 122b formed on the focus ring 122, the protrusion 122b that sticks out along the optical axis X comes into contact with the far distance end 123b of the macro ring 123, just as in normal mode.

On the other hand, as shown in FIG. 5B, on the close distance side in macro mode, turning the macro ring 123 to switch modes moves the positions of the far distance end 123b and the 123c in the peripheral direction.

Therefore, before the protrusion 122b sticking out along the optical axis X hits the close distance end 123c, the protrusion 122a sticking out in the radial direction hits the close distance end 131a of the restricting groove 131 formed in the stationary frame 130.

Consequently, in macro mode, a different end from that in normal mode can be used to restrict the rotatable range of the focus ring 122.

The range of the marking in macro mode is "0.15 to 0.35 m."

That is, with the lens barrel 120 in this embodiment, the marking corresponding to the close distance end in normal mode (0.3 m) is slightly different from the marking corresponding to the far distance end in macro mode (0.35 m). Therefore, the rotatable range of the focus ring 122 is restricted by using an end (the close distance end 131a) constituted by a different member from that in normal mode.

1-3. Effect, Etc.

As discussed above, with the lens barrel 120 in this embodiment, when the normal mode and the macro mode are switched by turning the macro ring 123, this operation is accompanied by movement of the rotatable range of the focus ring 122 in the peripheral direction.

Consequently, only the subject distance range over which imaging is possible in each mode is indicated by the marking ring. Accordingly, even with the lens barrel 120 that features mode switching, display of the subject distance according to the marking ring is possible.

In this embodiment, an example was described in which the close distance end was restricted using different members in normal mode and macro mode, but the present disclosure is not limited to or by this.

For instance, the rotatable range of the focus ring 122 in each mode may be restricted using a common end.

Here again, during mode switching, as the macro ring 123 is turned, the far and close distance ends that come into contact with part of the focus ring 122 move in the peripheral direction, so a different rotatable range can be set in each mode.

Other Embodiments

Embodiment 1 was described above as examples of the technology disclosed herein, but the technology disclosed herein is not limited to this, and can also be applied as needed to embodiments featuring modifications, substitutions, additions, omissions, and so forth. Also, the various constituent elements described in Embodiment 1 above can be combined into new embodiments.

An embodiment was described above as an example of the technology disclosed herein, and the appended drawings and detailed description were provided to that end.

Therefore, the constituent elements illustrated in the appended drawings and discussed in the detailed description can encompass not only those constituent elements that are essential to solving the problem, but also constituent elements that are not essential to solving the problem. Accordingly, just because these non-essential constituent elements are illustrated in the appended drawings and discussed in the detailed description, it should not be concluded that these non-essential constituent elements are essential.

Also, the above embodiment was given to illustrate an example of the technology disclosed herein, so various modifications, substitutions, additions, omissions, and so forth can be made within the scope of the patent claims or equivalents thereof.

INDUSTRIAL APPLICABILITY

The present disclosure can be applied to any lens barrel used in an imaging device. More specifically, it can be applied to a digital still camera, a single-lens reflex camera, a mirrorless camera, or the like.

The invention claimed is:

1. A lens barrel, comprising:
an imaging optical system including a plurality of lenses;
a focusing manipulation component configured to change the focal position of the imaging optical system by a turning operation and set a first imaging region and a second imaging region that is at least partly different;
an imaging state switching manipulation component configured to move at least some of the plurality of lenses operation by a turning operation and thereby switch between a first imaging state in which imaging is performed in the first imaging region and a second imaging state in which imaging is performed in the second imaging region;
a first restrictor configured to restrict the rotational limit position of the focusing manipulation component on the close distance side, and a second restrictor configured to restrict the rotational limit position on the far distance side, within the first imaging region; and
a third restrictor configured to restrict the rotational limit position of the focusing manipulation component on the close distance side, and a fourth restrictor configured to restrict the rotational limit position on the far distance side, within the second imaging region,
wherein when the imaging state switching manipulation component is turned to change from the first imaging state to the second imaging state, the range over which the focusing manipulation component can be turned is switched from a first range restricted by the first and second restrictors, to a second range restricted by the third and fourth restrictors and being at least partly shifted from the first range.

2. The lens barrel according to claim 1,
wherein at least one of the first to fourth restrictors is a convex component that is formed integrally with the imaging state switching manipulation component, and that comes into contact with part of the focusing manipulation component at both ends of the range over which the focusing manipulation component can be turned.

3. The lens barrel according to claim 1,
wherein at least one of the first to fourth restrictors is formed as a separate member from the imaging state switching manipulation component.

4. The lens barrel according to claim 3,
wherein a marking corresponding to the far distance side of the first range and a marking corresponding to the close distance side of the second range are set to different numerical values.

5. An imaging device, comprising:
the lens barrel according to claim 1; and
a camera body to which this lens barrel is mounted.

* * * * *